(12) United States Patent
Brady et al.

(10) Patent No.: US 9,769,149 B1
(45) Date of Patent: Sep. 19, 2017

(54) PROXY-LESS SECURE SOCKETS LAYER (SSL) DATA INSPECTION

(75) Inventors: Justin M. Brady, Livermore, CA (US); Aleksandr Dubrovsky, San Mateo, CA (US); Boris Yanovsky, Saratoga, CA (US)

(73) Assignee: SONICWALL INC., Santa Clara, CA (US)

( * ) Notice: Subject to any disclaimer, the term of this patent is extended or adjusted under 35 U.S.C. 154(b) by 1468 days.

(21) Appl. No.: 12/497,328

(22) Filed: Jul. 2, 2009

(51) Int. Cl.
  H04L 9/00 (2006.01)
  H04L 9/32 (2006.01)
  H04L 29/06 (2006.01)

(52) U.S. Cl.
  CPC ........ *H04L 63/0823* (2013.01); *H04L 9/3263* (2013.01); *H04L 63/0281* (2013.01); *H04L 63/0884* (2013.01); *H04L 63/1408* (2013.01); *H04L 63/166* (2013.01)

(58) Field of Classification Search
  CPC .... H04L 63/08; H04L 9/3263; H04L 63/0823
  USPC .......................................................... 713/151
  See application file for complete search history.

(56) References Cited

U.S. PATENT DOCUMENTS

| | | | |
|---|---|---|---|
| 5,796,942 A | 8/1998 | Esbensen | |
| 5,945,933 A | 8/1999 | Kalkstein | |
| 6,088,803 A | 7/2000 | Tso et al. | |
| 6,108,782 A | 8/2000 | Fletcher et al. | |
| 6,119,236 A | 9/2000 | Shipley | |
| 6,178,448 B1 | 1/2001 | Gray et al. | |
| 6,219,706 B1 | 4/2001 | Fan et al. | |
| 6,449,723 B1 | 9/2002 | Elgressy et al. | |
| 6,851,061 B1 | 2/2005 | Holland et al. | |
| 7,134,143 B2 | 11/2006 | Stellenberg et al. | |
| 7,152,164 B1 | 12/2006 | Loukas | |
| 7,185,368 B2 | 2/2007 | Copeland | |
| 7,304,996 B1 | 12/2007 | Swenson et al. | |
| 7,600,257 B2 | 10/2009 | Dubrovsky et al. | |

(Continued)

FOREIGN PATENT DOCUMENTS

| | | |
|---|---|---|
| EP | 1 122 932 | 8/2001 |
| EP | 1 528 743 | 5/2005 |
| WO | WO 97/39399 | 10/1997 |

OTHER PUBLICATIONS

"The Ultimate Internet Sharing Solution, WinProxy, User Manual," Copyright 1996-2002 Osistis Software, Inc., dated Feb. 2002 (290 pgs).

(Continued)

*Primary Examiner* — Linglan Edwards
(74) *Attorney, Agent, or Firm* — Polsinelli LLP

(57) ABSTRACT

Some embodiments of proxy-less Secure Sockets Layer (SSL) data inspection have been presented. In one embodiment, a secured connection according to a secured network protocol between a client and a responder is setup via a gateway device, which is coupled between the client and the responder. The gateway device transparently intercepts data transmitted according to the secured network protocol between the client and the responder. Furthermore, the gateway device provides flow-control and retransmission of one or more data packets of the data without self-scheduling the packet retransmissions using timeouts and based on the packet retransmission logic of either the client-side or the responder side of the connection. The gateway device is further operable to perform security screening on the data.

24 Claims, 6 Drawing Sheets

(56) References Cited

U.S. PATENT DOCUMENTS

| | | | | |
|---|---|---|---|---|
| 7,698,453 | B2* | 4/2010 | Samuels | H04L 41/12 709/218 |
| 7,809,386 | B2* | 10/2010 | Stirbu | H04W 12/02 370/328 |
| 7,835,361 | B1 | 11/2010 | Dubrovsky et al. | |
| 7,839,859 | B2* | 11/2010 | Kim | H04L 43/08 370/394 |
| 7,849,502 | B1 | 12/2010 | Bloch et al. | |
| 8,130,747 | B2* | 3/2012 | Li | H04L 41/0893 370/351 |
| 2002/0083331 | A1 | 6/2002 | Krumel | |
| 2003/0065800 | A1 | 4/2003 | Wyschogrod et al. | |
| 2003/0084328 | A1 | 5/2003 | Tarquini et al. | |
| 2003/0110208 | A1 | 6/2003 | Wyschogrod et al. | |
| 2003/0145228 | A1 | 7/2003 | Suuronen et al. | |
| 2003/0154399 | A1 | 8/2003 | Zuk et al. | |
| 2004/0093513 | A1 | 5/2004 | Cantrell et al. | |
| 2004/0123155 | A1 | 6/2004 | Etoh et al. | |
| 2004/0199790 | A1 | 10/2004 | Lingafelt et al. | |
| 2004/0255163 | A1 | 12/2004 | Swimmer et al. | |
| 2005/0021999 | A1* | 1/2005 | Touitou | H04L 63/1458 726/11 |
| 2005/0050362 | A1* | 3/2005 | Peles | H04L 63/04 713/151 |
| 2005/0108411 | A1* | 5/2005 | Kliland | H04L 63/029 709/230 |
| 2005/0120243 | A1 | 6/2005 | Palmer et al. | |
| 2005/0135380 | A1 | 6/2005 | Sahita et al. | |
| 2005/0187916 | A1 | 8/2005 | Levin et al. | |
| 2005/0216770 | A1 | 9/2005 | Rowett et al. | |
| 2005/0262556 | A1 | 11/2005 | Waisman et al. | |
| 2006/0020595 | A1 | 1/2006 | Norton et al. | |
| 2006/0069787 | A1 | 3/2006 | Sinclair | |
| 2006/0077979 | A1 | 4/2006 | Dubrovsky et al. | |
| 2007/0058551 | A1 | 3/2007 | Brusotti et al. | |
| 2008/0034073 | A1 | 2/2008 | McCloy et al. | |
| 2008/0126794 | A1* | 5/2008 | Wang | H04L 63/0464 713/151 |
| 2008/0178278 | A1* | 7/2008 | Grinstein | H04L 63/0227 726/12 |
| 2008/0235755 | A1* | 9/2008 | Blaisdell et al. | 726/1 |
| 2009/0271613 | A1* | 10/2009 | Brabson | 713/151 |
| 2012/0131330 | A1* | 5/2012 | Tonsing | H04L 63/1408 713/153 |

OTHER PUBLICATIONS

Roesch, Martin and Green, Chris, "Snort Users Manual," Snort Release 2.0.0, M. Roesch, C. Green, Copyright 1998-2003 M. Roesch, Copyright 2001-2003 C. Green, Copyright 2003 Sourcefire, Inc. dated Dec. 8, 2003 (53 pgs).

Bellovin, S., "Firewall-Friendly FTP," Network Working Group, RFC No. 1579, AT&T Bell Laboratories, Feb. 1994, http://www.ietf.org/rfc1579.txt?number=1579, downloaded Jul. 15, 2002, 4 pages.

European Search Report, Application No. EP 04 02 5579, May 23, 2005, 3 pages.

Office Action for U.S. Appl. No. 10/697,846 mailed Jan. 5, 2007, 16 pages.

Kruegal, Christopher, et al. "Using Decision Trees to Improve Signature-Based Intrusion Detection", Sep. 8, 2003, RAID 2003: recent Advance in Intrusion Detection, 20 pages.

Branch, Joel, et al., "Denial of Service Intrusion Detection Using Time Dependent Deterministic Finite Automata", RPI Graduate Research Conference 2002, Oct. 17, 2002, 7 pages.

Juniper Networks, "Attack Prevention," www.juniper.net/products/intrusion/prevention.html, downloaded Jun. 11, 2004, 2 pages.

Juniper Networks, "Attack Detection," www.juniper.net/products/intrusion/detection.html, downloaded Jun. 11, 2004, 7 pages.

Juniper Networks, "Intrusion Detection and Prevention," www.juniper.net/products/intrustion/ downloaded Jun. 11, 2004.

Juniper Networks, "Architecture," www.juniper.net/products/intrusion/architecture.html, downloaded Jun. 11, 2004, 3 pages.

Juniper Networks, "Juniper Networks NetScreen-IDP 10/100/500/1000," Intrusion Detection and Prevention, Spec Sheet, Apr. 2004, 2 pages.

Roberts, Paul, "NetScreen Announces Deep Inspection Firewall," IDG News Service, Oct. 20, 2003, http://www.nwfusion.com/news/2003/1020netscannou.html, downloaded Jun. 11, 2004, 5 pages.

Snort.org, "The Open Source Network Intrusion Detection System", www.snort.org/about.html, 2 pages.

Blyth, Andrew, "Detecting Intrusion", School of Computing, University of Glamorgan, 14 pages.

Office Action mailed Mar. 1, 2010 for U.S. Appl. No. 11/112,252, filed Apr. 21, 2005., 40 pages.

Final Office Action mailed Oct. 19, 2009 for U.S. Appl. No. 11/112,252, filed Apr. 21, 2005., 32 pages.

Office Action mailed Mar. 31, 2009 for U.S. Appl. No. 11/112,252, filed Apr. 21, 2005., 35 pages.

Office Action mailed Apr. 29, 2008 of U.S. Appl. No. 11/112,252, filed Apr. 21, 2005. 25 pages.

Office Action mailed Nov. 14, 2008 of U.S. Appl. No. 11/112,252, filed Apr. 21, 2005. 26 pages.

Office Action mailed Oct. 2, 2007 of U.S. Appl. No. 10/964,871, filed Oct. 13, 2004. 19 pages.

Final Office Action mailed Mar. 20, 2008 of U.S. Appl. No. 10/964,871, Oct. 13, 2004. 19 pages.

Office Action mailed Jul. 16, 2008 of U.S. Appl. No. 10/964,871, Oct. 13, 2004. 21 pages.

Office Action mailed Jan. 9, 2009 of U.S. Appl. No. 10/964,871, Oct. 13, 2004. 21 pages.

"SonicWALL Content Filtering Service," Comprehensive Internet Security™, © 2005, 2pp.

SonicWALL Internet Security Appliances, "Content Security Manager Integrated Solutions Guide", Version 3.0, © 2007, 160 pp.

SonicWALL Internet Security Appliances, "SonicOS 3.8 Standard Administrator's Guide", © 2007, 362 pp.

"SonicOS Standard 3.8.0.2 Release Notes, SonicWALL Secure Anti-Virus Router 80 Series," SonicWALL, Inc., Software Release: Apr. 11, 2007, 13 pp.

Gateway Anti-Virus, Anti-Spyware and Intrusion Prevention Service, Unified Threat Management, Intelligent Real-time Protection, © 2005, 2 pp.

"SonicWALL Endpoint Security: Anti-Virus, Automated and Enforced Anti-Virus and Anti-Spyware Protection," © 2007, Mar. 2007, 2 pp.

"SonicWaLL Content Security Manager Series, Easy-to-use, Affordable, Content Security and Internet Threat Protection," © 2006, Dec. 2006, 4 pp.

"SonicWALL Complete Anti-Virus, Automated and Enforced Anti-Virus Protection," © 2005, 2 pp.

Aggarwal, N., "Improving the Efficiency of Network Intrusion Detection Systems", Indian Institue of Technology, May 3, 2006, pp. 1-40.

Van Engelen, R., "Constucting Finite State Automata for High-Performance XML Web Services," International Symposium on Web Services and Applications, 2004, pp. 1-7.

Lucas, Simon M., et al., "Learning Deterministic Finite Automata with a Smart State Labeling Evolutionary Algorithm," IEEE Transaction on Pattern Analysis and Machine Intelligence, vol. 27, No. 7, Jul. 2005, pp. 1063-1074.

Office Action mailed Jul. 7, 2010 of U.S. Appl. No. 11/778,546, Jul. 16, 2007. 15 pages.

Office Action mailed May 14, 2009 of U.S. Appl. No. 11/772,723, Jul. 2, 2007. 7 pages.

Office Action mailed Oct. 23, 2009 of U.S. Appl. No. 11/772,723, Jul. 2, 2007. 8 pages.

Republic of China Search Report Application No. 093133045, Aug. 5, 2011, 1 pg.

ROC (Taiwan) Office Action, Patent Application No. 093133045 dated Sep. 8, 2011, 5 pages.

Office Action mailed Mar. 13, 2012 of U.S. Appl No. 12/238,205, filed Sep. 25, 2008, 30 pages.

(56) References Cited

OTHER PUBLICATIONS

Notice of Allowance mailed Mar. 8, 2010 of U.S. Appl No. 11/772,723, Jul. 2, 2007, 9 pages.
Notice of Allowance mailed Mar. 17, 2011 of U.S. Appl. No. 11/778,546, Jul. 16, 2007, 10 pages.
Office Action mailed Oct. 22, 2010 of U.S Appl. Appl. No 11/778,546, Jul. 16, 2007, 12 pages.
Office Action mailed Feb. 18, 2011 for U.S. Appl. No 11/837,779, Aug. 13. 2007, 27 pgs.
Non-Final Office Action Response, filed on Dec. 10, 2010 regarding U.S. Appl. No. 11/837,770, filed Aug. 13, 2007, 17 pages.
Office Action mailed Sep. 13, 2010 for U.S. Appl. No. 11/837,779, Aug. 13, 2007, 26 pgs.
Notice of Allowance and Fees Due mailed Mar. 16, 2012 for U.S. Appl No. 12/913,668, filed Oct. 27, 2010, 12 pages.
Office Action mailed Nov. 2, 2011 for U.S. Appl. No. 12/913,668, filed Oct. 27, 2010, 17 pgs.
Office Action mailed Jun. 24, 2011 for U.S. Appl. No. 12/913,668, filed Oct. 21, 2010, 16 pgs.
Notice of Allowance and Fees Due mailed Oct. 5, 2010 for U.S. Appl. No. 11/112,252, filed Apr. 21, 2005, 10 pgs.
Notice of Allowance and Fees Due rnailed Apr. 4, 2012 for U.S. Appl. No. 12/547,860, filed Aug. 26, 2009, 14 pages.
Office Action mailed Sep. 26, 2011 of U S. Appl. No. 12/547,860, filed Aug. 26, 2009, 10 pages.
Office Action mailed May 3, 2011 of U.S. Appl. No. 12/547,860, filed Aug. 26, 2009, 17 pages.
Office Action mailed Dec. 10, 2010 of U.S. Appl. No. 12/547,860, filed Aug. 26, 2009, 18 pgs.
Office Action mailed Aug. 31, 2010 of U.S. Appl No. 12/547,860, Aug. 26, 2009, 14 pages.
Notice of Allowance and Fees Due mailed Jun. 3, 2009 for U.S. Appl. No. 10/964,871, filed Oct. 13, 2004, 10 pgs.
Office Action mailed Jan. 9, 2009 of U.S. Appl. No. 10/964,871, Oct. 13, 2004.
Notice of Allowance and Fees Due mailed Jun. 20, 2007 for U.S. Appl. No. 10/697,846, filed Oct. 13, 2004, 8 pgs.
Giles, C. et al., "Learning a Class of Large Finite State Machines with a Recurrent Neural Network," Neural Networks, vol. 8. No. 9, pp. 1359-1365, 1995.
Holzmann, G., et al., "A Minimized Automation Representation of Reachable States," Int. J STTT 2. pp. 270-278, 1999.
Villa, Oreste. Feb. 2008. IBM Research Report Too many words, too little time: Accelerating real-time keyword scanning with multi-core processors. Retrieved from http://domino.research.ibm.com/library/cyberdignsf/papers/9EB4740B4B0739CF852573F5005A6311/$FileIrc24488.pdf. Retrieval data Mar. 5, 2012, 6 pgs.

* cited by examiner

PROXY-LESS SECURE SOCKETS LAYER (SSL) DATA INSPECTION

TECHNICAL FIELD

The present invention relates to intrusion detection and prevention in a networked system, and more particularly, to providing proxy-less data inspection.

BACKGROUND

FIG. 1 illustrates a current networked system 100. Conventionally, to make a secure connection between the client 110 and a server 120, the following operations are performed. A web browser on the client is configured to point to a proxy Internet Protocol (IP) address for Hypertext Transfer Protocol Secured (HTTPS) connections. An initial CONNECT request with full Universal Resource Locator (URL) is sent by the client 110 to a proxy 130 between the client 110 and the server 120. The proxy 130 connects to the HTTPS server 120 using the full URL provided in the client's 110 request. The HTTPS server 120 sends back a certificate. The proxy 130 strips out relevant information from the certificate (e.g., common name, etc.) and creates a new certificate signed by a certification-authority certificate, which the user of the proxy 130, i.e., the client 110, has indicated to trust. Eventually, the newly generated certificate is passed to the client 110 and the client 110 accepts the certificate.

Data is decrypted on one connection, and clear-text (i.e., decrypted data) is inspected. Then the data is re-encrypted when sent on another connection. As a result, two TCP/SSL connections 115 and 125 are established, namely, a first connection 125 between the proxy 130 and the server 120, and a second connection 115 between the client 110 and the proxy 130, where each connection supports full Transmission Control Protocol (TCP) flow-control logic. Packet loss re-transmissions are handled individually for each connection and all retransmission scheduling is done on the proxy 130.

One disadvantage of the above scheme is that the client's 110 browser has to be configured with the proxy's IP address. The above scheme is not so scalable due to full TCP based flow control implemented on the inspecting device and due to the fact that sockets do not scale well for large number of connections. Furthermore, it is difficult to configure for non-HTTP protocols.

BRIEF DESCRIPTION OF THE DRAWINGS

The present invention is illustrated by way of example, and not by way of limitation, in the figures of the accompanying drawings and in which.

DETAILED DESCRIPTION

Figure 1:
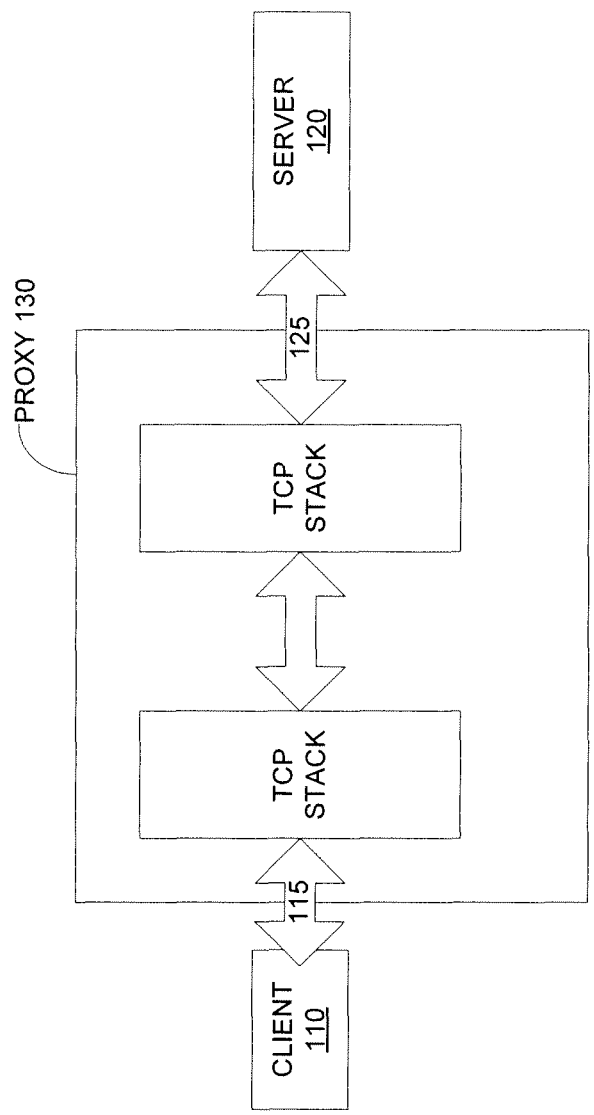
FIG. 1 illustrates a conventional networked system with a proxy.

Described herein are some embodiments of proxy-less Secured Sockets Layer (SSL) data inspection. In one embodiment, a TCP connection is established between a client (a.k.a. the initiator) and a HTTPS server (a.k.a. the responder). The client's web browser (or any network access application) issues a connection request, e.g., SSL Hello, to the server. A proxy-less SSL inspection appliance, such as a gateway device, intercepts the Hello request and sends an identical copy to the server. In response, the server sends a certificate to the proxy-less SSL inspection appliance. The proxy-less SSL inspection appliance strips out relevant information from the certificate (e.g., common name, etc.) and creates a new certificate signed by a certification-authority certificate, which the client has indicated to trust. The newly generated certificate is passed from the proxy-less SSL inspection appliance to the client. The client accepts the newly generated certificate because this certificate is signed by the certification-authority certificate. Packets received by the proxy-less SSL inspection appliance are decrypted and inspected by the proxy-less SSL inspection appliance using various mechanisms, such as deep packet inspection (DPI), content filtering, etc. After inspection, the proxy-less SSL inspection appliance re-encrypts the packets and forwards the packets to the client if there is no security issue with passing the packets. If potential malware or forbidden content is found in the packets, then the proxy-less SSL inspection appliance may block the packets from the client. The proxy-less SSL inspection appliance may further send a message to warn the client of its finding.

In the above scheme, TCP re-transmission logic is event driven based on retransmissions from server side and client side, rather than being scheduled by a TCP stack on each side of the TCP connection. In other words, the proxy-less SSL inspection appliance provides flow-control and retransmission of data packets without self-scheduling the packet retransmission using timeouts, but rather, based on the packet retransmission logic of either the client-side or server-side of the connection. As a result, security inspection of clear-text can take place at the proxy-less SSL inspection appliance without using a full TCP-based proxy.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMS), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
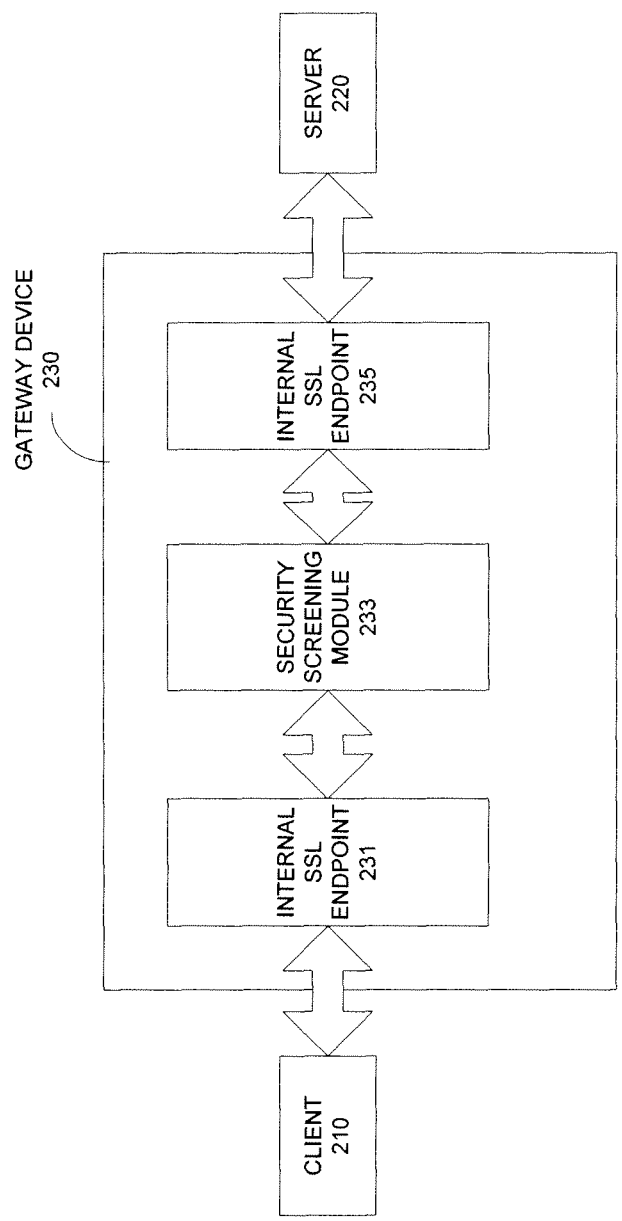
FIG. 2 illustrates one embodiment of a proxy-less system.

FIG. 2 illustrates one embodiment of a proxy-less system. The proxy-less system 200 includes a client 210, a server 220, and a gateway device 230 coupled between the client 210 and the server 220. When the client 210 initiates a connection with the server 220, the client 210 may be referred to as an initiator and the server 220 may be referred to as a responder, and vice versa. The client 210 and the server 220 may be implemented using various computing devices, such as personal computers, laptop computers, personal digital assistants (PDAs), cellular telephones, smartphones, etc. The gateway device 230 may also be implemented using various computing devices, such as those listed above. In some embodiments, the gateway device 230 is implemented as a set-top box coupled to the client 210 locally. The gateway device 230 acts as a "middleman" device between the client 210 and the server 220.

In some embodiments, the gateway device 230 may intercept a client connection request from the initiator, say the client 210, before it reaches the intended endpoint, say the server 220, and generate IP TCP packets as replies as if they were originated from that endpoint, and to do the same for communication with the original responder endpoint. Separate TCP state is kept for communication with the initiator and responder endpoints at the gateway device 230. This state contains data allowing the gateway device 230 to do flow-control and retransmission. For example, the state may include a sequence number of the last packet received, which may be used in determining if the next packet is dropped or lost. In order to increase scalability and to simplify the gateway device 230, TCP retransmission to a receiver may only be done when a retransmit from the sender is seen in some embodiments. Data from one side is not acknowledged until it is acknowledged by the opposite endpoint.

During connection setup, the TCP handshake is allowed to complete between the two hosts, but once the client attempts to send data to negotiate a secured connection (e.g., SSL), the request is passed to an internal secured endpoint (such as the internal secured endpoint 231 or 235 in FIG. 2) on the gateway device 230. Before this endpoint continues negotiation, the gateway device 230 may first initiate a secured client connection to the responder endpoint, store the responder certificate details, and complete the key exchange.

Afterwards, secured connection certificate and/or key exchange and negotiation is completed with the initiator, optionally using a certificate dynamically generated with details from the responder certificate as discussed below. Because the gateway device 230 chooses the public keys and does the negotiation to terminate the SSL connection, it is possible for the gateway device 230 to inspect the clear text data sent by both sides. Once both connections are established, decrypted clear text data is transferred from one connection to the other as follows.

In some embodiments, the data received by the gateway device 230 from the initiator may be encrypted and sent over the responder secured connection, and vice versa. In this way, it is possible to view and/or modify the clear text data sent from one endpoint to the other. No configuration on either end (i.e., the client 210 and the server 220) is necessary because the gateway device 230 which sits on the path between the two sides can detect when to attempt secured decrypting and/or re-encrypting by detecting a connection to a known SSL TCP port, or by detecting a presence of a valid SSL Hello packet to any port. As opposed to a conventional explicit third party SSL proxy, where the connecting client must be aware of the forwarding proxy relationship and contact the proxy SSL endpoint directly, both sides' TCP and SSL states appear to be communicating with their original endpoints, so this interception is transparent to both sides.

As discussed above, the gateway device 230 may dynamically generate a certificate in the process of establishing a secured connection between the client 210 and the server 220. In some embodiments, the client 210 may use RSA encryption to verify a certificate delivered by the server 220 is "signed" by a third party authority that has previously been trusted by the client 210. For instance, the client 210 may have previously accepted a certification-authority (CA) certificate from this third party. When the gateway device 230 intercepts the secured connection and responds using its own internal secured endpoint 235, it is necessary to deliver a certificate containing a public key that the gateway device 230 has the private key for, so that key exchange is possible. The certificate also contains attributes to identify the endpoint to the client 210. In general, the client 210 may verify these attributes before continuing to negotiate further. If the attributes do not all match what is expected, the client 210 may warn the user before continuing. In order to appear legitimate, the certificate details from the responder certificate from the server 220 are stored by the gateway device 230 and a new certificate is generated that appears substantially identical, except for the public key. The newly generated certificate is then signed by the CA certificate, which the client 210 has previously trusted. In this way, all checks done by the client 210 on the certificate may pass, and the client may complete the connection and begin sending data to the server 220 via the gateway device 230.

Figure 3:
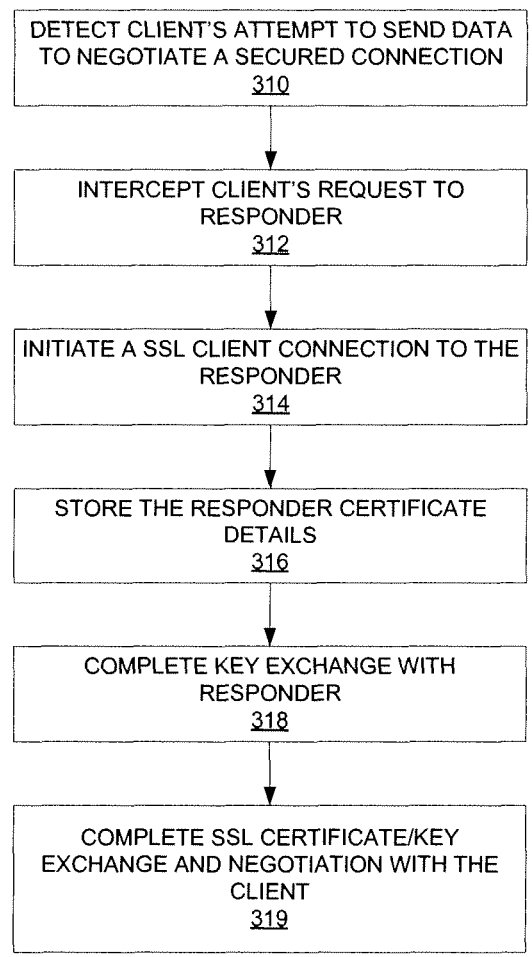
FIG. 3 illustrates one embodiment of a method to establish a secured connection between a client and a responder without a proxy.

FIG. 3 illustrates one embodiment of a method to establish a secured connection between a client and a responder without a proxy. The method may be performed by processing logic that may comprise hardware (e.g., circuitry, dedicated logic, programmable logic, processing cores, etc.), software (such as instructions run on a processing core), firmware, or a combination thereof.

Initially, processing logic detects a client's attempt to send data to negotiate a secured connection with a responder (processing block 310). For example, the secured connection may be SSL. Then processing logic intercepts the client's request to responder (processing block 312). Processing logic initiates a secured client connection to the responder (processing block 314). In response, the responder may send a certificate to processing logic. Processing logic stores the responder's certificate details (processing block 316). Then processing logic completes key exchange with the responder (processing block 318). Finally, processing logic completes secured connection certificate and/or key exchange and negotiation with the client (processing block 319). To complete secured connection certificate and/or key exchange and negotiation with the client, processing logic may dynamically generate a new certificate to send to the client.

Figure 4:
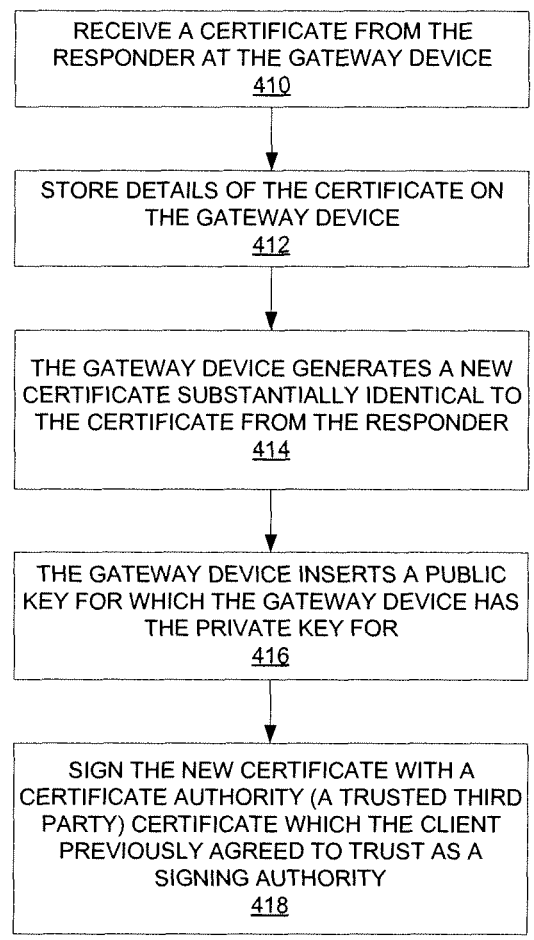
FIG. 4 illustrates one embodiment of a method to dynamically generate a certificate.

FIG. 4 illustrates one embodiment of a method to dynamically generate a certificate. The method may be performed by processing logic that may comprise hardware (e.g., circuitry, dedicated logic, programmable logic, processing cores, etc.), software (such as instructions run on a processing core), firmware, or a combination thereof.

Initially, processing logic receives a certificate from the responder at a gateway device (processing block 410). Then processing logic stores details of the certificate, such as common name, on the gateway device (processing block 412). Processing logic generates a new certificate substantially identical to the certificate from the responder at the gateway device (processing block 414). Processing logic inserts a public key into the certificate at the gateway device, where the gateway device has the private key for the public key (processing block 416). In some embodiments, the public key is pre-generated at the gateway device along with its private key pair. Finally, processing logic signs the new certificate with a certificate authority (usually a trusted third party) certificate, which the client has previously agreed to trust as a signing authority (processing block 418). Note that the same public key may be inserted into all new certificates subsequently generated at the gateway device for the current connection.

Figure 5:
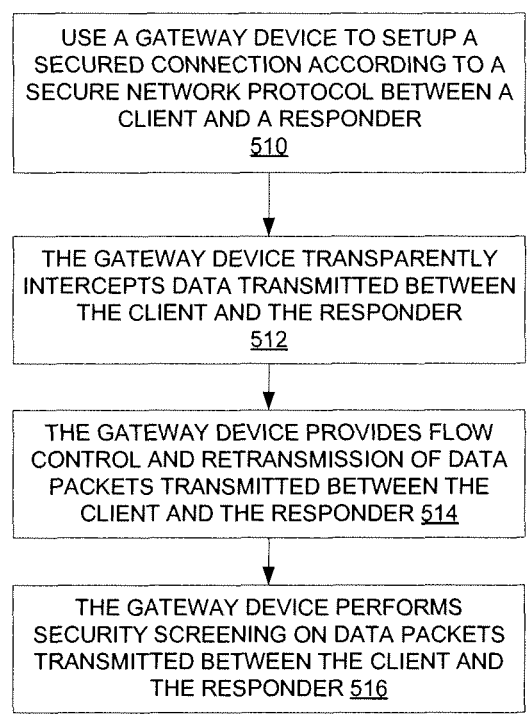
FIG. 5 illustrates one embodiment of a method to perform proxy-less data inspection.

FIG. 5 illustrates one embodiment of a method to perform proxy-less data inspection. The method may be performed by processing logic that may comprise hardware (e.g., circuitry, dedicated logic, programmable logic, processing cores, etc.), software (such as instructions run on a processing core), firmware, or a combination thereof.

Initially, processing logic uses a gateway device (such as the gateway device 230 shown in FIG. 2) to set up a secured connection according to a secure network protocol (e.g., SSL) between a client and a responder (processing block 510). Details of some embodiments of the secured connection setup have been discussed in details above. Then processing logic uses the gateway device to transparently intercept data transmitted between the client and the responder (processing block 512). Processing logic further uses the gateway device to provide flow control and retransmission of data packets transmitted between the client and the responder (processing block 514). The flow control and retransmission of data may be provided without self-scheduling the packet retransmission using timeouts at the gateway device, but rather, based on the packet retransmission logic of either the client-side or the responder-side of the connection. Using the gateway device, processing logic performs security screening on data packets transmitted between the client and the responder (processing block 516). The security screening may include content filtering, deep packet inspection, etc.

Figure 6:
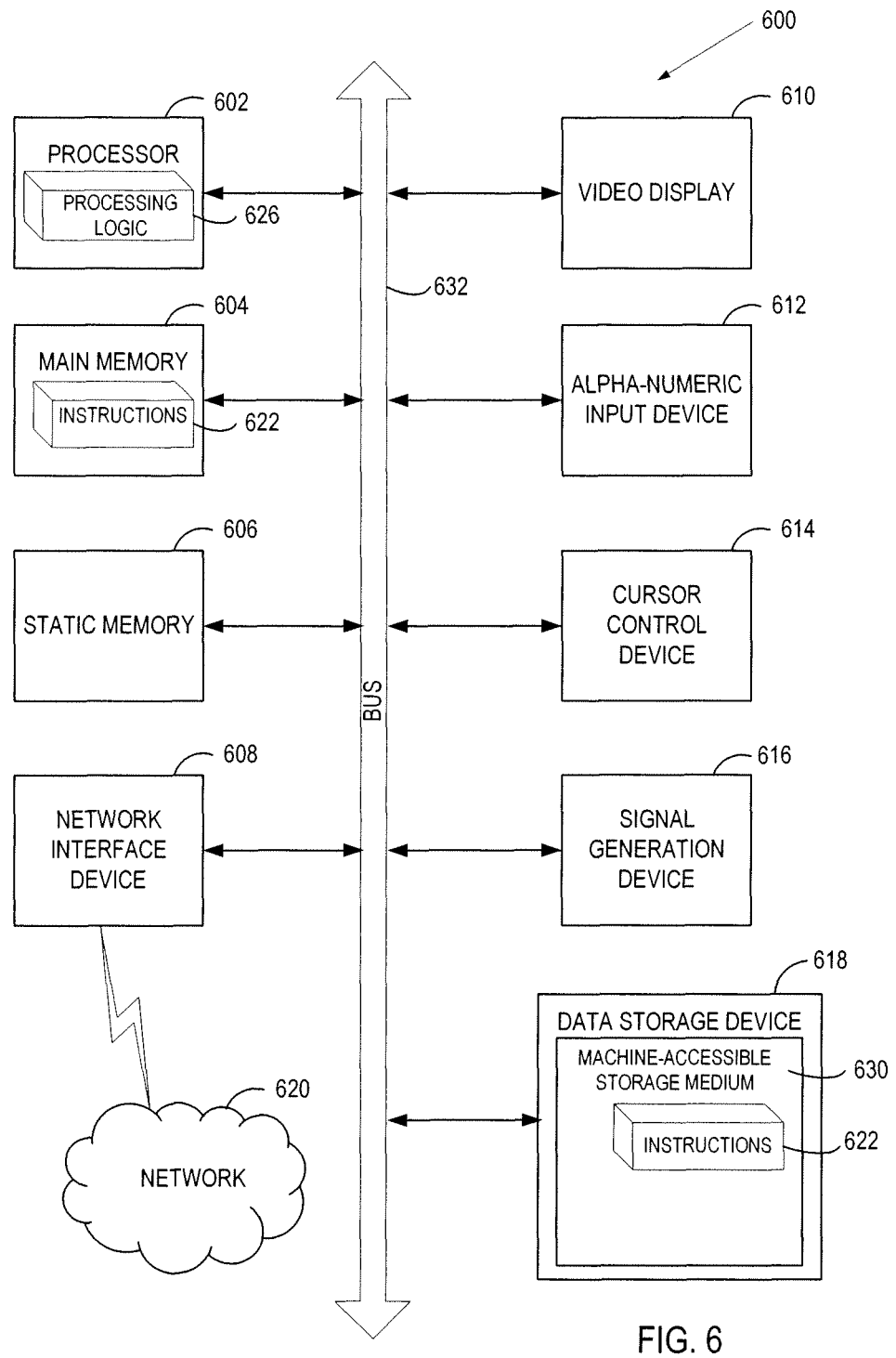
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 632.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 518 may include a machine-accessible storage medium 630 (also known as a machine-readable storage medium or a computer-readable medium) on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc. In some embodiments, machine-accessible storage medium may also be referred to as computer-readable storage medium.

Thus, some embodiments of cloud-based gateway antivirus scanning have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for performing proxy-less data inspection, the method comprising:
    intercepting at a gateway device a connection request for a secured connection between a client and a responder; and
    executing a set of instructions stored in memory of the gateway device, wherein execution of the instructions by a processor of the gateway device:
        sets up the secured connection according to a secured network protocol between the client and the responder by:
            passing the connection request to an internal secured endpoint on the gateway device,
            requesting a first certificate from the responder in response to intercepting the connection request,
            receiving the first certificate from the responder, and
            establishing the secured connection with a second certificate that is a modified copy of the first certificate received from the responder, wherein a public key of the second certificate is different from a public key of the first certificate, and wherein a remaining portion of the second certificate is identical to a remaining portion of the first certificate; and
        intercepts data transmitted according to the secured network protocol between the client and the responder while remaining transparent to the client and the responder, wherein remaining transparent includes performing flow-control and retransmission of one or more data packets of the data without self-scheduling the packet transmissions using retransmission timeouts at the gateway device, and wherein performing the flow-control and retransmission includes:
            maintaining a first transmission control protocol (TCP) state at the gateway device for the client and maintaining a second TCP state at the gateway device for the responder, wherein the first TCP state includes a sequence number of the last packet received by the client and the second TCP state includes a sequence number of the last packet received by the responder,
            retransmitting a data packet to the client based on receiving a retransmission from the responder and based on the gateway device not using retransmission timeouts, and
            retransmitting a data packet to the responder based on receiving a retransmission from the client and based on the gateway device not using retransmission timeouts; and performs security screening on the intercepted data.

2. The method of claim 1, wherein further execution of the instructions by the processor of the gateway device:
    detects an attempt by the client to negotiate for the secured connection according to the secured network protocol; and
    initiates the secured connection according to the secured network protocol from the client to the responder.

3. The method of claim 2, wherein establishing the secured connection includes:
    storing details of the first certificate in memory;
    completing key exchange with the responder; and
    completing certificate and key exchange with the client.

4. The method of claim 3, wherein completing certificate and key exchange with the client includes:
    generating the remaining portion of the second certificate that is identical to the remaining portion of the first certificate from the responder;
    inserting the second certificate public key into the second certificate to replace the first certificate public key in the first certificate, wherein the gateway device has a private key corresponding to each public key; and
    signing the second certificate with a third certificate from a third party trusted by the client as a signing authority.

5. The method of claim 4, wherein further execution of the instructions by the processor of the gateway device:
    pre-generates the public key along with a corresponding private key pair; and
    inserts the same public key into one or more certificates generated at the gateway device subsequent to the second certificate rather than generating a new public/private key pair for every newly generated certificate.

6. The method of claim 1, wherein the security screening includes:
    decrypting the data using a private key stored at the gateway device; and
    performing deep packet inspection on the decrypted data.

7. The method of claim 1, wherein the security screening includes:
    decrypting the data using a private key stored at the gateway device;
    and performing content filtering on the decrypted data.

8. The method of claim 1, wherein the secured network protocol is a Secure Sockets Layer-based protocol.

9. A gateway device, comprising:
    a first internal secured connection endpoint communicatively coupled to a client over an internal network, the first internal secured connection endpoint set up by:
        intercepting a connection request for a secured connection from the client to a responder,
        requesting a first certificate from the responder,
        receiving the first certificate from the responder, and establishing the secured connection with a second certificate that is a modified copy of the first certificate, wherein a public key of the second certificate is different from a public key of the first certificate, and wherein a remaining portion of the second certificate is identical to a remaining portion of the first certificate;

a second internal secured connection endpoint communicatively coupled to the responder over an external network, wherein the first and second internal secured connection endpoints transparently intercept data transmitted between the client and the responder according to a secured network protocol between the client and the responder; and a processor that executes instructions stored in memory, wherein execution of the instructions:

performs flow-control and retransmission of one or more data packets of the data without the gateway device using retransmission timeouts wherein performing the flow-control and retransmission includes:

maintaining a first transmission control protocol (TCP) state at the gateway device for the client and maintaining a second TCP state at the gateway device for the responder, wherein the first TCP state includes a sequence number of the last packet received by the client and the second TCP state includes a sequence number of the last packet received by the responder, retransmitting a data packet to the client based on receiving a retransmission from the responder and based on the gateway device not using retransmission timeouts, and retransmitting a data packet to the responder based on receiving a retransmission from the responder and based on the gateway device not using retransmission timeouts, and identifies that the client is to be blocked from receiving a file corresponding to the data.

10. The gateway device of claim 9, wherein the first internal secured connection endpoint detects an attempt by the client to negotiate for a secured connection according to a secured network protocol, and the first internal secured connection endpoint initiates the secured connection according to the secured network protocol via the second internal secured connection endpoint responsive to the attempt.

11. The gateway device of claim 10, wherein the secured network protocol is a Secure Sockets Layer-based protocol.

12. The gateway device of claim 10, wherein the first internal secured connection endpoint completes certificate and key exchange with the client and the second internal secured connection endpoint receives the first certificate from the responder, stores details of the first certificate in a storage device, and completes key exchange with the responder.

13. The gateway device of claim 12, wherein the second internal secured connection endpoint:

generates the remaining portion of the second certificate that is identical to the remaining portion of the first certificate from the responder using the details stored in the storage device;

inserts the second certificate public key into the second certificate to replace the first certificate public key in the first certificate; and signs the second certificate with a third certificate from a third party trusted by the client as a signing authority, wherein the storage device further stores a private key corresponding to each public key.

14. The gateway device of claim 13, wherein the public key is pre-generated on the gateway device along with its corresponding private key pair, and the same public key is inserted into one or more certificates generated subsequent to the second certificate by the gateway device rather than the gateway device generating a new public/private key pair for every certificate generated subsequent to the second certificate.

15. The gateway device of claim 9, wherein the processor identifies that the client is to be blocked from receiving a file corresponding to the data based on deep packet inspection.

16. The gateway device of claim 9, wherein determines that the client is to be blocked from receiving a file corresponding to the data based on content filtering.

17. A non-transitory computer-readable storage medium having instructions embodied thereon, the instructions executable by a processor of a gateway device communicatively coupled between a client and a responder to perform a method of proxy-less data inspection, the method comprising:

intercepting at a gateway device a connection request for a secured connection between the client and the responder;

setting up the secured connection between the client and the responder according to a secured network protocol by:

passing the connection request to an internal secured endpoint on the gateway device, requesting a first certificate from the responder in response to intercepting the connection request, receiving the first certificate from the responder, and establishing the secured connection with a second certificate that is a modified copy of the first certificate received from the responder, wherein a public key of the second certificate is different from a public key of the first certificate, and wherein a remaining portion of the second certificate is identical to a remaining portion of the first certificate; and intercepting data transmitted according to the secured network protocol between the client and the responder while remaining transparent to the client and the responder, wherein remaining transparent includes performing flow-control and retransmission of one or more data packets of the data self-scheduling the packet transmissions using retransmission timeouts at the gateway device, and wherein performing the flow-control and retransmission includes:

maintaining a first transmission control protocol (TCP) state at the gateway device for the client and maintaining a second TCP state at the gateway device for the responder, wherein the first TCP state includes a sequence number of the last packet received by the client and the second TCP state includes a sequence number of the last packet received by the responder, retransmitting a data packet to the client based on receiving a retransmission from the responder and based on the gateway device not using retransmission timeouts, and retransmitting a data packet to the responder based on receiving a retransmission from the client and based on the gateway device not using retransmission timeouts; and performing security screening on the intercepted data.

18. The non-transitory computer-readable storage medium of claim 17, wherein the method further comprises:

detecting an attempt by the client to negotiate for the secured connection according to the secured network protocol; and initiating the secured connection according to the secured network protocol from the client to the responder.

19. The non-transitory computer-readable storage medium of claim 18, wherein establishing the secured connection includes:

storing details of the first certificate in a storage device of the gateway device;

completing key exchange with the responder; and completing certificate and key exchange with the client.

20. The non-transitory computer-readable storage medium of claim 19, wherein completing certificate and key exchange with the client includes:

generating the remaining portion of the second certificate identical to the remaining portion of the first certificate from the responder;

inserting the second certificate public key into the second certificate to replace the first certificate public key in the first certificate, wherein the gateway device has a private key corresponding to each public key; and signing the second certificate with a third certificate from a third party trusted by the client as a signing authority.

21. The non-transitory computer-readable storage medium of claim 20, wherein the method further comprises:

pre-generating the public key along with a corresponding private key pair; and inserting the same public key into one or more certificates generated at the gateway device subsequent to the second certificate rather than generating a new public/private key pair for every newly generated certificate.

22. The non-transitory computer-readable storage medium of claim 17, wherein performing security screening on the data includes:

decrypting the data at the gateway device using a private key stored at the gateway device; and performing deep packet inspection on the decrypted data at the gateway device.

23. The non-transitory computer-readable storage medium of claim 17, wherein performing security screening on the data includes:

decrypting the data at the gateway device using a private key stored at the gateway device; and performing content filtering on the decrypted data at the gateway device.

24. The non-transitory computer-readable storage medium of claim 17, wherein the secured network protocol is a Secure Sockets Layer-based protocol.

\* \* \* \* \*